United States Patent [19]
Fernando et al.

[11] Patent Number: 5,611,936
[45] Date of Patent: Mar. 18, 1997

[54] DECHLORINATION OF TCE WITH PALLADIZED IRON

[75] Inventors: Quintus Fernando; Rosy Muftikian, both of Tucson, Ariz.; Nic Korte, Grand Junction, Colo.

[73] Assignee: Research Corporation Technologies, Inc., Tucson, Ariz.

[21] Appl. No.: 363,125

[22] Filed: Dec. 23, 1994

[51] Int. Cl.$^6$ ........................................................ C02F 1/70
[52] U.S. Cl. ............................ 210/747; 210/757; 210/908; 210/909
[58] Field of Search ................................... 210/757, 908, 210/909, 747

[56] References Cited

FOREIGN PATENT DOCUMENTS

| | | |
|---|---|---|
| 0363258 | 4/1990 | European Pat. Off. . |
| 0514177 | 11/1992 | European Pat. Off. . |
| 3620459 | 12/1986 | Germany . |
| 3941813 | 6/1991 | Germany . |
| 2238533 | 6/1991 | United Kingdom . |
| WO9213805 | 8/1992 | WIPO . |

OTHER PUBLICATIONS

Agrawal, et al., "Abiotic Remediation of Nitro–Aromatic Groundwater Contaminants By Zero–Valent Iron", American Chemical Society Abstract, Division of Environmental Chemistry, pp. 492–494, (1984).

Matheson, et al., "Abiotic and Biotic Aspects of Reductive Dechlorination Of Chlorinated Solvents By Zero–Valent Iron", American Chemical Society Abstract, Division of Environmental Chemistry, pp. 414–415, (1994).

Matheson, et al., "Processes Affecting Reductive Dechlorination of Chlorinated Solvents By Zero–Valent Iron", American Chemical Society Abstract, Division Of Environmental Chemistry, pp. 3–4, (1993).

Schrier, et al., "Transformation Of Tetrachloroethylene By Iron Powder", American Chemical Society Abstract, Division of Environmental Chemistry, p. 51, (1993).

O'Hannesin, et al., "In Situ Degradation Of Halogenated Organics By Permeable Reaction Wall", EPA Ground Water Currents, pp. 1–2, (Mar. 1993).

Hassan, et al. "Reduction Of Halogenated Hydrocarbons With Iron: II. Mechanism Of The Reaction." American Chemical Society Abstract, Division Of Environmental Chemistry, pp. 8–9, (1993).

Boyes, et al., "Supported Metal Catalysts For CFC Hydrodehalogenation", American Chemical Society, Division Of Petroleum Chemistry, pp. 847–849, (1993).

Méthé, et al., "Active Environment Protection: Hydrodehalogenation Of Polychlorinated Compounds", Hazardous Waste: Detection, Control, Treatment, ed. R. Abbou, pp. 1615–1619, (1988).

Mallát, et al., "Reduction By Dissolving Bimetals", Tetrahedron vol. 47, No. 3 pp. 441–446, (1991).

Coq, et al., "Conversion Under Hydrogen Of Dichlorodifluoromethane Over Bimetallic Palladium Catalysts", Applied Catalysis A: General, 101, pp. 41–50 (1991).

Primary Examiner—Neil McCarthy
Attorney, Agent, or Firm—Scully, Scott, Murphy & Presser

[57] ABSTRACT

The present invention relates to various methods, such as an above-ground method and an in-ground method, of using a palladized iron bimetallic system for the dechlorination of chlorinated organic compounds from effluents containing the same. The use of palladized iron bimetallic system results in the dechlorination of the chlorinated organic compound into environmentally safe reaction products. The present invention also provides kits, devices, and other instruments that use the above-mentioned palladized iron bimetallic system for the dechlorination of chlorinated organic compounds.

53 Claims, 10 Drawing Sheets

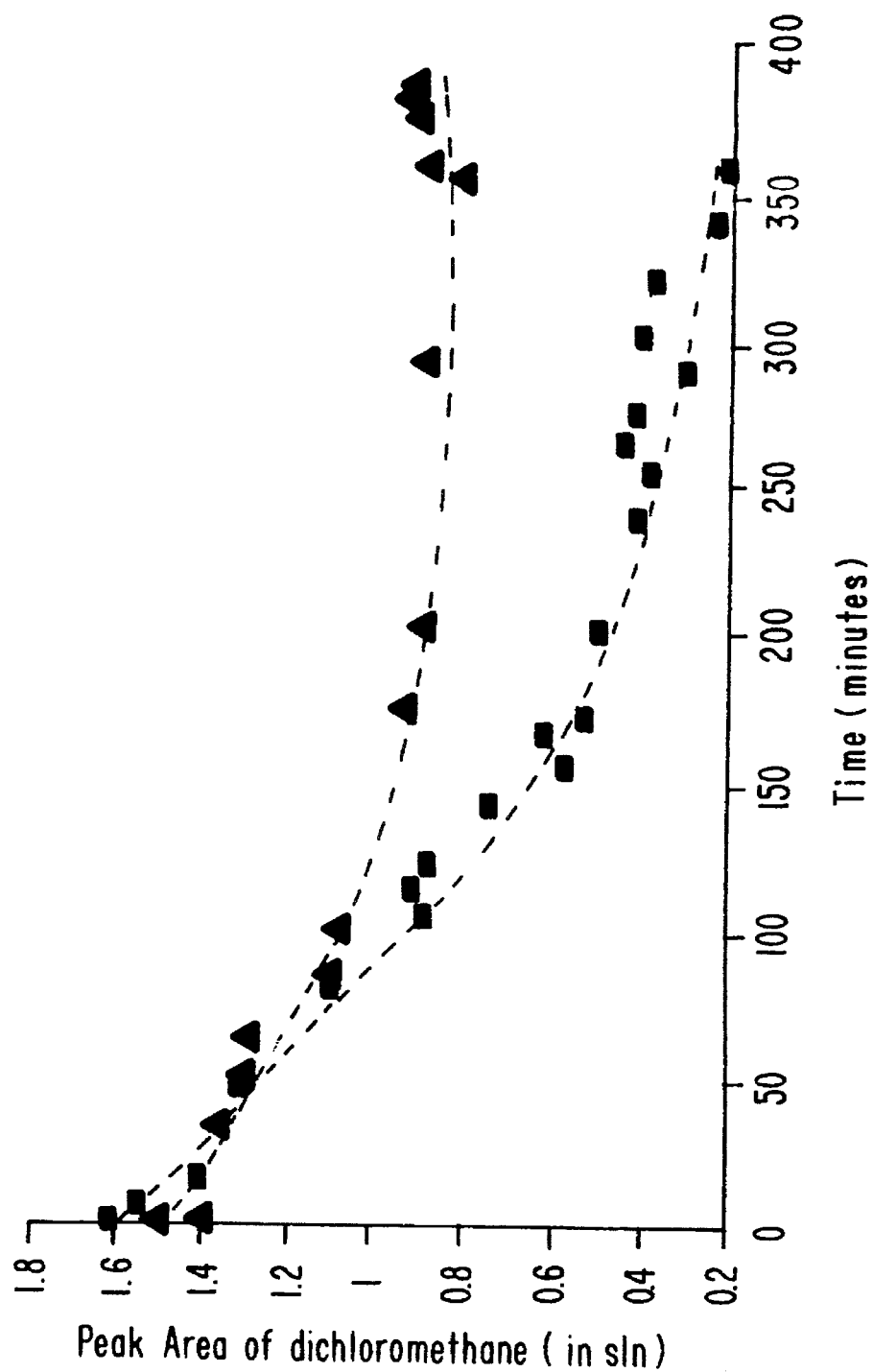

DECHLORINATION OF TCE WITH PALLADIZED IRON

The present subject matter was supported by a grant from the Department of Energy, Grant Nos. DE-AC05-840R21400 and DE-AC05-760R00001.

FIELD OF THE INVENTION

The present invention relates to a method of using a palladized iron bimetallic system for the dechlorination of chlorinated organic compounds from, in particular, aqueous effluents containing the same or effluents containing small amounts of organic solvents in which the chlorinated organic compounds are dissolved. The present invention also relates to an above-ground method and an in-ground method for dechlorinating chlorinated organic compounds. The instant invention is directed to kits, devices, and methods of use employing a palladized iron bimetallic system for the dechlorination of chlorinated organic compounds from the aforementioned effluents. Complete or partial dechlorination of chlorinated organic compounds can be achieved in the present invention.

BACKGROUND OF THE INVENTION

Saturated and unsaturated chlorinated aliphatic hydrocarbons containing one to three carbon atoms, such as 1,1,2-trichloroethylene (TCE), are commonly used as industrial solvents and their hazards to the environment as well as to the public have been extensively studied. In the past, many industrial companies have improperly and illegally disposed of these chlorinated solvents and as a result such compounds are often found as groundwater contaminants.

One of the most prevalent chlorinated hydrocarbon contaminants in groundwater today is TCE which is widely used industrially for degreasing various metals. Tetrachloroethylene, perchloroethylene (PCE), and dichloromethane, which are widely used for paint stripping and in the dry cleaning industry, are also common groundwater contaminants. Remediation of groundwater containing these low molecular weight compounds is of significant importance and several commercial systems have been recently developed to remove these contaminants not only from the groundwater but also from industrial effluents and waste streams.

Of the systems currently available, above-ground treatment methods have been found to be the most effective for removal of these chlorinated compounds from aqueous effluents. In one such method, highly volatile TCE is stripped from the contaminated water flowing down a column by a countercurrent stream of air. The TCE is adsorbed on granular activated carbon and periodically desorbed from it. The activated carbon is regenerated with steam, and when its efficiency as an adsorbent decreases below about 95% it is replaced. The spent activated carbon adsorbent is eventually buried in a landfill when its adsorptive capacity decreases to a significant extent.

In other above-ground methods, the halogenated organic compounds are destroyed by adding hydrogen peroxide or ozone when an aqueous solution containing the halogenated organic compound is irradiated by high intensity ultraviolet radiation. The use of hydrogen peroxide or ozone for the above purpose is disclosed, for example, in H. Pallet et al., Ozone Science and Engineering, Vol. 9 (1987), pp. 391–418; P. Gehringer et al., Appl. Radiation Isotope, Vol. 43 (1992), pp. 1107–1115; W. D. Sundstrom et al., Hazardous Waste and Hazardous Materials, Vol. 3 (1986), pp. 101–110; and W. H. Glaze et al., Ozone Science and Engineering, Vol. 9 (1987), pp. 335–352.

Recent reports have shown that elemental iron can be employed to dehalogenate many low molecular weight chlorinated hydrocarbons. See, for example, J. E. Barbash et al., American Chemical Society Meeting Abstracts, 1992, April 5–10; L. J. Matheson et al., "Processes Affecting Reductive Dechlorination of Chlorinated Solvents by Zero-Valent Iron", American Chemical Society Meeting Abstracts, 1993 Mar. 28–Apr. 2; L. J. Matheson et al., "Abiotic and Biotic Aspects of Reductive Dechlorination of Chlorinated Solvents by Zero-Valent Iron", American Chemical Society Meeting Abstracts, 1994, March 13–18; and A. Agrawal et al., "Abiotic Remediation of Nitro-Aromatic Groundwater Contaminants by Zero-Valent Iron", American Chemical Society Abstracts, 1994, March 13–18.

These reports show that the degradation of chlorinated hydrocarbons by elemental iron is $10^3$ to $10^6$ times faster than abiotic or biotic degradation. Batch as well as column experiments show that $CCl_4$, $CHCl_3$, TCE and PCE were degraded. Trace quantities of dichloromethylene were found in these investigations, but no vinyl chloride which is an undesirable intermediate in the dechlorination reaction was detected.

At present, an in-ground treatment method using elemental iron is undergoing field investigations. The details of this investigation are published by S. F. O'Hannesin and R. W. Gillham in an article entitled "In-situ Degradation of Halogenated Organics by Permeable Reaction Walls" EPA Ground Water Currents, 1993, pp. 1–2. Specifically, the reference employs a permeable reaction wall that consists of elemental iron and sand. This reaction wall is installed about one meter below the water table in the direction of flow of the plume of contaminated water. Preliminary results of this investigation have indicated that 95% of the TCE and 91% of the PCE in the contaminated water is reduced.

Despite the current interest in using elemental iron for the reductive dechlorination of chlorinated solvents, the initial dechlorination reaction of TCE is too slow and the intermediate reaction products, i.e., 1,1 dichloroethylene and 1,2-dichloroethylene, also dechlorinate very slowly. Given the slow reaction kinetics observed for the dechlorination reaction of TCE, the above-ground remediation of groundwater by a pump and treat method using elemental iron is too slow to be useful for the continuous treatment of large quantities of contaminated water. Thus, continued research is ongoing to develop a rapid and more efficient method for the dechlorination of these halogenated compounds.

New methods for the dechlorination of TCE have been recently developed and reported by S. N. Hassan et al., "Reduction of Halogenated Hydrocarbons with Iron: II. Mechanism of the Reaction", American Chemical Society Abstracts, 1993, Mar. 28–Apr. 2. Specifically, in this abstract, Hassan et al. discloses that the use of nickel- or copper-containing elemental iron may increase or decrease the reaction kinetics of the reductive dechlorination of TCE. The exact details of this investigation, however, have not been published to date.

In order to provide a more efficient method for the reductive dechlorination of TCE from groundwater contaminants, the applicants of the instant invention have conducted extensive research in this area. As a result, the present inventors have found that the use of palladized iron bimetallic system completely and rapidly dechlorinates TCE, as well as many other chlorinated organic compounds, more efficiently than prior art systems.

SUMMARY OF THE INVENTION

The present invention is directed to the use of a palladized iron bimetallic system for the dechlorination of chlorinated organic compounds from effluents containing the same. Specifically, the instant invention is related to the use of a palladized-iron bimetallic system which is especially suited for the dechlorination of chlorinated organic compounds from an aqueous effluent containing the same. More particularly, it has been found that the use of the palladized iron bimetallic system for the dechlorination of TCE results in a rapid and complete dechlorination of the chlorinated organic compound to ethane and chloride ion.

The present invention also provides an above-ground method of dechlorinating chlorinated organic compounds from an effluent containing the same. More specifically, the above-ground dechlorination method of the instant invention comprises: (a) providing a water treatment device containing a palladized iron bimetallic system disposed therein; (b) providing groundwater containing at least one chlorinated organic compound to said water treatment device of step (a); and (c) reacting said groundwater with said palladized iron bimetallic system under conditions sufficient to dechlorinate the chlorinated organic compound.

The present invention is also directed to an in-ground method of dechlorinating chlorinated organic compounds. More specifically, the in-ground method of the instant invention comprises (a) providing a device for use in underground water treatment, wherein said underground water treatment device contains a palladized iron bimetallic system disposed therein; (b) inserting said underground water treatment device into an underground water supply containing at least one chlorinated organic compound; and (c) reacting said underground water with said palladized iron bimetallic system under conditions sufficient to dechlorinate said chlorinated organic compound.

The present invention further provides a kit for dechlorinating chlorinated organic compounds from an effluent containing the same. More specifically, the kit of the instant invention, which could be used at home or industrially, comprises a device, such as a filter or column having a palladized iron bimetallic system disposed therein.

BRIEF DESCRIPTION OF THE DRAWINGS

FIG. 10 is a graph of the peak area of dichloromethane vs. time. The ■ denotes palladized iron whereas ▲ denotes Ni/Fe bimetallic system.

DETAILED DESCRIPTION OF THE INVENTION

Figure 1:
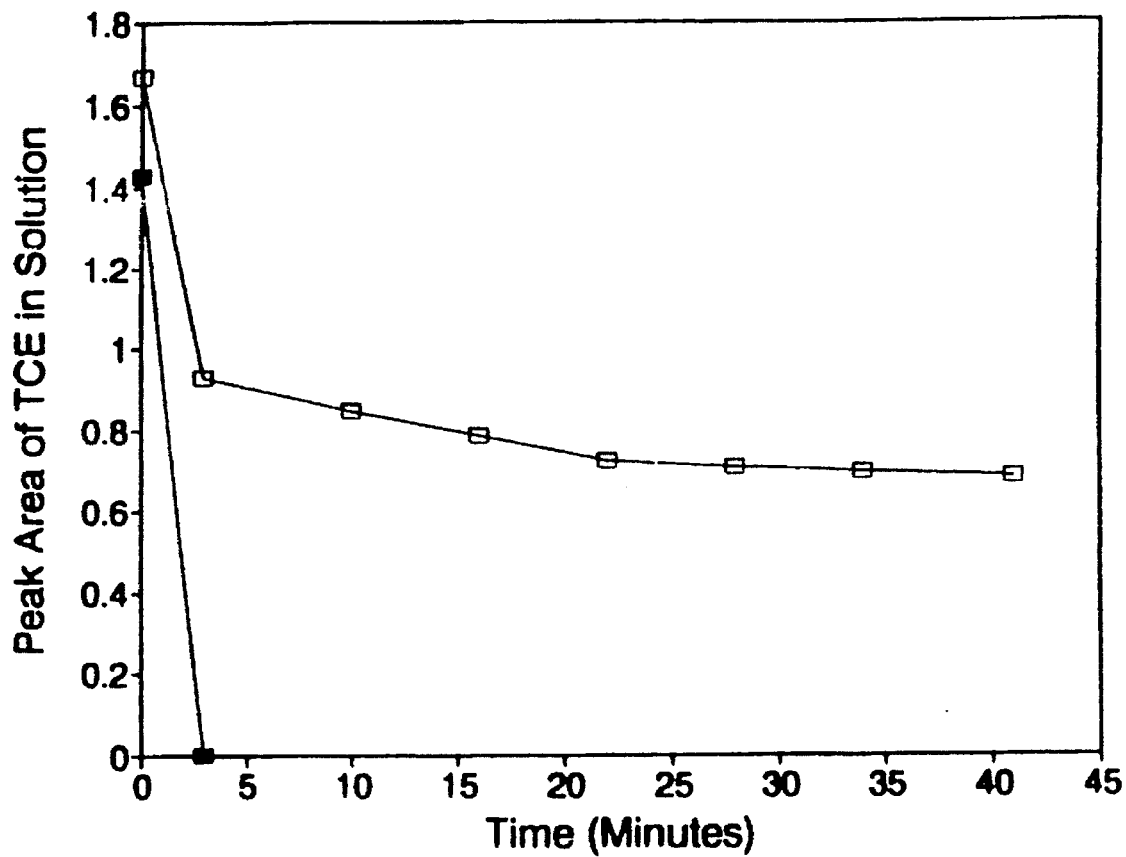
FIG. 1 illustrates the reaction of TCE (20 ppm in water) in contact with iron and palladized iron (40 mesh). The □ denotes the reaction of TCE with iron, whereas the ■ denotes the reaction of TCE with palladized iron.

The present invention provides a palladized iron bimetallic system for use in the dechlorination of chlorinated organic compounds from effluents containing the same. Specifically, one embodiment of the instant invention is directed to a method comprising contacting an effluent containing at least one chlorinated organic compound with a palladized iron compound under conditions sufficient to dechlorinate the chlorinated organic compound contained in the effluent. A reaction mixture of the effluent and palladized iron bimetallic system is prepared first and appropriate conditions are provided to permit the reaction to continue to effect, depending on the conditions employed, complete or partial dechlorination of the chlorinated organic compounds from the effluent provided.

The term effluent as used herein includes aqueous effluents such as drinking water, bathing water, water from a lake, river, stream, etc., as well as, waste water from an industrial plant and water containing small amounts of an organic solvent, such as methanol, in which a chlorinated organic compound, such as pentachlorophenol, is dissolved. In accordance with one of the preferred embodiments of the instant invention, the effluent is an aqueous effluent.

The palladized iron bimetallic system of the instant invention comprises a palladium-containing iron metal which is prepared by depositing palladium metal onto the surface of iron metal. More specifically, the palladized iron bimetallic system is prepared by admixing a solution of a palladium-containing compound with the iron metal, and allowing the redox reaction to proceed spontaneously.

This reaction of admixing the palladium-containing solution with the iron metal is carried out at a temperature of about 20° C. to about 40° C. for a period of time from about 10 minutes to about 30 minutes. More preferably, the reaction of the palladium-containing solution and the iron metal is conducted at a temperature from about 28° C. to about 35° C. for a period of about 5 minutes to about 20 minutes. During the course of the redox reaction, the mixture containing the iron metal and the palladium-containing solution is continuously stirred. Moreover, during the course of the reaction the initial color of the solution changes. For example, if $K_2PdCl_6$ is employed, the initial red-orange color of the solution turns to pale yellow during the course of the reaction.

This color changes signifies that a redox reaction is occurring in the reaction mixture. Specifically, this color change indicates that the iron metal is being oxidized and the palladium-containing compound is being reduced to elemental palladium. It should be emphasized that elemental palladium deposited on the elemental iron by the above-mentioned chemical reaction or electrochemical deposition by applying an appropriate external potential to the iron is necessary to provide the palladized iron bimetallic system of the instant invention and that the palladized iron bimetallic system is used for the rapid dechlorination of chlorinated organic compounds. Under the appropriate reaction conditions, complete dechlorination of the chlorinated compound can be achieved in the instant invention.

The above-identified deposition process results in a palladized iron bimetallic system that has from about 0.005 to about 50% palladium on the surface and/or in the pores of the iron metal. More preferably, the deposition results in a palladized iron bimetallic system that has from about 0.1 to about 20% palladium on the surface and/or in the pores of the iron metal. Most preferably, the palladized iron bimetallic system of the instant invention has about 5% palladium on the surface and/or in the pores of the iron metal.

It should be emphasized that the above described deposition process does not result in an even or uniform coating of palladium on the surface and/or the pores of the iron metal. Rather, the deposition process results in the formation of discrete islands or pockets of palladium on the surface and/or in the pores of the iron metal. These palladium islands or pockets are essential to the performance of the palladized iron bimetallic system of the instant invention in that those features provide active sites which are necessary for the dechlorination reaction to occur. Without the formation of palladium islands or pockets on the surface and/or in the pores of the iron metal, an insufficient number of active sites will be present. Such a bimetallic system containing an insufficient number of active sites would not be suitable for use in the rapid dechlorination of chlorinated organic compounds.

Suitable palladium-containing compounds that can be employed in the instant invention in preparing the palladized iron bimetallic system include palladium bromide, palladium chloride, potassium hexachloropalladate, potassium tetrachloropalladate, sodium hexachloropalladate tetrahydrate, sodium tetrachloropalladate, tetraaminepalladium chloride monohydride, palladium acetate, palladium acetylacetonate, and any other palladium compound in which palladium is in the $^+$II or $^+$IV oxidation state. Mixtures of the above-identified palladium-containing compounds can also be employed in the present invention.

Of these palladium-containing compounds listed hereinabove, it is particularly preferred that the palladium-containing compound used in forming the palladized iron bimetallic system be potassium hexachloropalladate, potassium tetrachloropalladate, sodium hexachloropalladate tetrahydrate or sodium tetrachloropalladate. Potassium hexachloropalladate is the most preferred palladium-containing compound employed in the present invention.

As stated above, an aqueous solution of the palladium-containing compound of the instant invention is admixed with the iron metal. The solution is formed by admixing the palladium-containing compound with a suitable solvent that is capable of dissolving the palladium-containing compound. Suitable solvents employed in the instant invention comprise high dielectric solvents such as water. Of these solvents, it is preferred that water be used as the solvent to dissolve the palladium-containing compound.

In accordance with the present invention, the molar ratio of palladium-containing compound added to the iron metal is from about $10^{-6}$ to about $10^{-4}$. More preferably, the molar ratio of palladium-containing compound to iron metal is from about $5 \times 10^{-5}$ to about $5 \times 10^{-4}$.

The iron metals that can be employed in the present invention as the substrate are highly pure iron metals including iron wool, iron mesh, iron wire, iron grating, iron tubing, iron powder, iron particles, iron turnings, iron filings, sponge iron and the like thereof. Iron-containing alloys may also be employed in the present invention as the source of the iron metal.

These iron metals can be of any size or shape provided that such metals can be placed in the reaction vessel used in preparing the palladized iron bimetallic system. Of these types of iron metals, iron mesh and iron particles are particularly preferred. By highly pure, it is meant that the surface of the iron metal or alloy should be essentially free of impurities.

The iron metal may be used as is, or alternatively, it may be treated with an inorganic acid prior to deposition of the palladium-containing compound. Suitable inorganic acids that may be employed in the instant invention include hydrochloric acid (HCl). In accordance with a preferred embodiment of the instant invention, 6M HCl is used to treat the surface of the iron metal.

The above treatment of the iron metal with an inorganic acid removes impurities and surface oxides from the iron metal. These impurities and surface oxides may adversely affect the activity, as well as the efficiency, of the palladized iron bimetallic system in the dechlorination of the chlorinated organic compounds.

When iron particles are employed as the source of iron metal, it is preferred that the iron particles have a particle size ranging from about 5 µm to about 100 µm. More preferably, the iron particles employed in the instant invention have a particle size ranging from about 10 µm to about 15 µm.

After the deposition of palladium onto the iron metal, the excess palladium-containing solution that is not adsorbed onto the iron metal is removed using techniques well known in the art. For example, the excess palladium-containing solution may be removed by decantation, filtration, centrifugation or the like.

In accordance with the method of the instant invention, an effluent which contains at least one chlorinated organic compound is added to the palladized iron bimetallic system under conditions sufficient to form a reaction mixture thereof. Mixtures of the chlorinated organic compounds may also be present in the effluent. Chlorinated organic compounds are typically present in the effluent in concentrations ranging from about 0.10 ppb to about 2000 ppm. More preferably, the concentration of the chlorinated organic compounds in the effluent is from about 5 ppm to about 200 ppm.

The term chlorinated organic compound is meant to include compounds such as saturated chlorinated aliphatic compounds, unsaturated chlorinated aliphatic or aromatic compounds, polychlorinated biphenyls (PCBs) and pesticides which contain at least one chlorine atom substituent in its structure.

The term unsaturated chlorinated aliphatic or aromatic hydrocarbon compound is meant to denote open-chain compounds and those cyclic compounds that resemble open-chain compounds. The unsaturated chlorinated compounds employed in the instant invention contain at least one multiple bond (double or triple), at least one chlorine atom substituent, and from about 2 to about 10 carbon atoms. Preferably, the unsaturated chlorinated compounds used in the present invention contain from about 2 to about 6 carbon atoms.

Examples of unsaturated chlorinated compounds include 1,1,2-trichloroethylene, 1,2-dichloroethylene, perchloroethylene, chlorinated phenols, 1,1-dichloroethene, trans-1,2-dichloroethene, cis and trans-1,3-dichloropropene, vinyl chloride and the like thereof. It is a particularly preferred embodiment of the present invention that the unsaturated chlorinated compound is 1,1,2-trichloroethylene (TCE).

The term saturated chlorinated aliphatic compound is used in the present invention to denote open-chain compounds or cyclic compounds that resemble open-chain compounds. Suitable saturated chlorinated aliphatic hydrocarbon compounds that may be present in the effluent include carbon tetrachloride, dichloromethane, chloroform, bromodichloromethane, chloroethane, dibromochloromethane, dichlorodifluoromethane, 1,1-dichloroethane, 1,2-dichloroethane, 1,2-dichloropropane, 1,1,2,2-tetrachlorethane, 1,1,1-trichloroethane, trichlorofluoromethane and the like thereof.

The polychlorinated biphenyl (PCB) compounds which can be dechlorinated by the method of the present invention are well known to those skilled in this art. Examples of PCB compounds that can be dechlorinated by the instant invention include, but are not limited to, compounds such as 1,1,1-trichloro-2,2-bis(p-chlorophenyl) ethane (DDT), 1,1,-dichloro-2,2-bis(p-chlorophenyl) ethane (DDD), 1,1-dichloro-2,2-bis(p-chlorophenyl) ethene, 2,2-bis(p-methoxyphenyl)-1,1,1-trichloroethane, O,O-bis(p-chlorophenyl) acetimidoylphosphoramidothioate, 2,4-dichlorophenyl p-nitrophenyl ether, α,α-bis(p-chlorophenyl)-3-pyridine methanol, 1,1-dichloro-2,2-bis(p-ethylphenyl) ethane, O-(4-bromo-2,5-dichlorophenyl),
O-methylphenylphosphonothioate, 4' chlorophenyl 2,4,5-trichlorophenyl sulfone and the like thereof.

Suitable chlorine-containing pesticides that can be dechlorinated by the method of the present invention include decachlorooctahydro-1,3,4-metheno-2-H-cyclobuta [cd] pentalene-2-one, 1,2,3,4,5,6-hexachlorocyclohexane, dodecachlorooctahydro-1,3,4-metheno-1H-cyclobuta[cd]-pentalene, 1,2-dibromo-2,2-dichloroethyldimethyl phosphate, O,O-dimethyl-O-(2,4,5-trichlorophenyl) phosphorothiate, 4-tert-butyl-2- chlorophenyl-O-methyl methylphosphoroamidate, S-(2-chloro-phthalimido-ethyl) O,O diethyl phosphorodithioate, chlorinated camphene, S-[[p-chlorophenyl)thio] methyl] O,O-diethyl phosphorodithioate, O-[2-chloro-1-(2,5-dichlorophenyl)-vinyl] O,O-diethyl phosphorothioate, 1,2,3,4,10,10-hexachloro-1, 4,4a,5,8,8a-hexahydro-1,4 endo-exo-5,8-dimethanonaphthalene, O,O-diethyl O-(3,5,6-trichloro-2-pyridyl) phosphorothioate, O,O-dimethyl(2,2,2-trichloro-1-hydroxylethyl) phosphonate, 6,7,8,9,10,10-hexachloro-1,5,5a,6,9,9a-hexahydro-6, 9-methano-2, 4,3-benzodioxathiepin-3-oxide, 1,2,3,4,10,10-hexachloro-6, 7-epoxy-1,4,4a,5,6,7,8,8a-octahydro-1,4-endo-endo-5,8-dimethanonaphthalene and the like thereof.

In accordance with the present invention, the effluent containing the chlorinated organic compound(s) is reacted with the palladized iron bimetallic system at a temperature from about 20° C. to about 40° C. for a period of time from about 30 seconds to about 10 hours. More preferably, this step is performed at a temperature from about 28° C. to about 35° C. for a period of time from about 1 minute to about 150 minutes. These conditions, depending on the desired end product, are sufficient to effect either complete or partial dechlorination of the chlorinated organic compound from the effluent. For example, these conditions are effective in completely dechlorinating TCE to ethane and hydrogen gas. Moreover, no intermediate reaction products such as vinyl chloride or DCE form using the above palladized iron bimetallic system and reaction conditions.

The palladized iron bimetallic system of the instant invention can be regenerated after continued use by adding a dilute solution of HCl (6M HCl) to remove any oxides or hydroxides of iron that are deposited on the iron surface during the dechlorination process.

The present invention also provides an above-ground method for dechlorinating the above-mentioned chlorinated organic compounds from an effluent containing the same. Specifically, the above-ground method of the present invention provides (a) a water treatment device containing a palladized iron bimetallic system disposed therein; (b) groundwater containing at least one chlorinated organic compound which is pumped to the water treatment device of step (a); and (c) said groundwater is reacted with said palladized iron bimetallic system under conditions sufficient to dechlorinate the chlorinated organic compound.

In accordance with step (b) of the above-ground dechlorination method of the instant invention, water from an underground source is pumped using means commonly employed in the art into the water treatment device of step (a) at a flow rate of about 1 gallon/minute to about 20 gallons/minute. More preferably the underground water is pumped to the water treatment device of step (a) at a rate of about 5 gallons/minute to about 10 gallons/minute.

The water treatment device used in the above-ground method of the instant invention is any water treatment device that is commonly employed in the art for such purposes. For example, the water treatment device employed in the present above-ground method includes such water treatment devices as filters, columns, skid-mounted systems, portable tanks or baths, perforated or non-perforated panels or walls, tubes or fluidized beds. It should be noted that one skilled in the art will know how to use the palladized iron bimetallic system of the instant invention in any of these water treatment devices. Of the water treatment devices mentioned hereinabove, it is particularly preferred that a column or a skid-mounted system be used for the above-ground method.

If a column is used for the above-ground method of dechlorinating chlorinated organic compounds, the palladized iron bimetallic system of the instant invention would be processed into beads, fibers, or films using techniques well known to one skilled in the art and mixed, depending on its use, with commercially available packing materials such as silica, alumina, and the like. The column would then be packed using techniques that are well known and described in the art. Depending on its application, the column may vary in length and reactor bed height. Typically, in the present invention, the column has a length from about 1 m to about 10 m and a reactor bed height from about 1 m to about 10 m. Longer and larger columns will of course be employed for industrial applications.

If a skid-mounted device is employed in the instant invention, underground water containing chlorinated organic compounds will be pumped into a tank that has palladized iron particles percolating therein. The underground water will remain in the tank for a period of time sufficient to dechlorinate the chlorinated organic compounds.

The present invention is also directed to an in-ground method for dechlorinating chlorinated organic compounds. More specifically, the in-ground method of the instant invention provides (a) a device for use in underground water treatment, wherein said underground water device contains a palladized iron bimetallic system disposed therein; (b) said underground water device is provided in an underground water supply which contains at least one chlorinated organic compound; and (c) said underground water is reacted with the palladized iron bimetallic system under conditions sufficient to dechlorinate the chlorinated organic compound.

The underground water treatment device used in step (a) of the in-ground method of the instant invention is also any of the commercially available water treatment devices that are commonly employed for treatment of underground water supplies. Examples of such underground water treatment devices include, but not limited to, bags, gates, tubes, perforated or non-perforated panels or walls and the like thereof.

The present invention also provides a kit for dechlorinating chlorinated organic compounds from an effluent containing the same. Specifically, the kit of the present invention includes a water treatment device having a palladized iron bimetallic system disposed therein. By water treatment device is meant any article through which a liquid can be passed therein to separate out a particular substance. Specifically, the term water treatment device includes, but is not limited to, devices such as filters, tubes, perforated or non-perforated panels or walls, or columns.

Typically, in the present invention the kit can be used to dechlorinate chlorinated organic compounds that are present in aqueous effluents at various concentrations including trace amounts. i.e., ppm level.

If a filter is employed in the kit of present invention, it is particularly preferred that the filter comprises a disposable cartridge which contains the palladized iron therein. The disposable cartridges employed in the present invention could be in the form of a pleated cylinder, flat disc, hollow disc, and the like depending on the specific use of the filter. For example, if the filter is being used for purifying drinking water, the cartridge containing the palladized iron would typically be in the form of a pleated cylinder having pore sizes ranging from 0.01 μm to 50 μm.

If a column is used in the present invention, the palladized iron would be processed into beads, fibers, or films using techniques well known to one skilled in the art and mixed, depending on its use, with commercially available packing materials such as silica, alumina, and the like. The column would then be packed using techniques that are well known and described in the art. Depending on its application, the column may varying in length and reactor bed height. Typically, in the present invention, the column of the kit has a length from about 1 m to about 10 m and a reactor bed height from about 1 m to about 10 m. Longer and larger columns will of course be employed for industrial applications.

The following examples are given to illustrate to the scope of the present invention. Because these examples are given for illustrative purposes only, the invention embodied therein should not be limited thereto.

EXAMPLE I

Preparation of Palladized Iron

Palladized iron bimetallic systems useful for the dechlorination of TCE were prepared in accordance with the preferred embodiments of the instant invention. Specifically, the palladized iron bimetallic systems were prepared by washing a 10 g sample of iron filings (40 mesh size) or a 10 g sample of iron particles (10 μm) with five to six 25 ml portions of 6M HCl solution followed by five to six 25 ml portions of distilled water. In a separate reaction vessel, fifteen to twenty milligrams of $K_2PdCl_6$ was dissolved in 30 to 40 ml of distilled water. The color of the solution containing the palladium-containing compound was reddish-orange. Portions of the hexachloropalladate solution were than added to the acid washed iron metal until the color of the solution turned pale yellow. This color change signified that the following redox reaction had occurred:

$$2Fe^0 + PdCl_6^{2-} \rightarrow 2Fe^{2+} + Pd^0 + 6Cl^-$$

The resultant palladized iron bimetallic systems, which have about 9% Pd deposited on the iron metal, were thereafter washed 3–4 times with distilled water and used, without drying in the dechlorination experiments.

Batch TCE Dechlorination Experiment

A twelve milliliter glass vial equipped with a teflon septum fitted into a cap was used in the batch dechlorination reactions. Ten grams of the thus prepared palladized iron bimetallic system containing the 40 mesh iron filings or 3.6 g of the palladized iron bimetallic system containing the 10 μm iron particles was added to the glass vial which contained 10 ml of a solution of TCE (20 ppm in water). The contents of the vial were then vigorously shaken and thereafter samples were withdrawn periodically with a syringe for GC analyses.

Control samples using iron filings or iron particles which do not contain palladium were subjected to the above dechlorination reaction and the results were compared to their palladized iron counterparts.

The GC analyses of the samples were carried out on a 5880A Hewlett Packard gas Chromatograph equipped with an Econo Cap capillary column (Alltech SE 30 30 m 1.0 μm) and a FID detector. The limit of detection was 1 ppm. The temperatures of the GC were set as follows: Oven temperature 150° C.; injection port temperature 250° C., and detector temperature 300° C. The flow rate was 1.35 ml/min, and helium was used as a carried gas. Sample injection volumes were 1.8 μL. A water sample, approximately 1.0 μL, was first drawn into the syringe followed by an air gap, then, 1.8 μL of the reaction sample. Injections were made every 3–4 minutes, alternating liquid and headspace samples.

Figure 2:
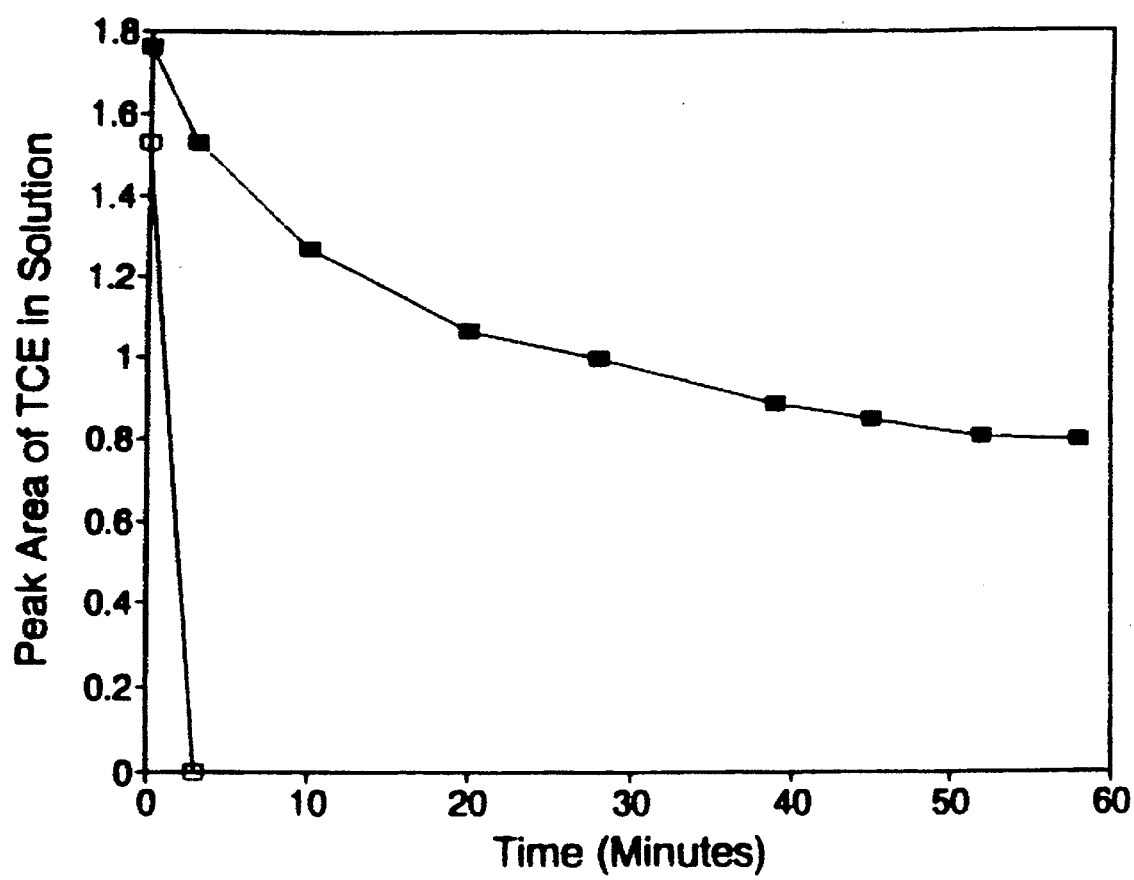
FIG. 2 illustrates the reaction of TCE (20 ppm in water) in contact with iron and palladized iron (10 μm particles). The ■ denotes the reaction of TCE with iron, whereas the □ denotes the reaction of TCE with palladized iron.

The results of the batch experiments are shown in FIG. 1 which shows that 10 g of palladized iron (5 mg Pd on 10 g Fe, 40 mesh) can completely dechlorinate 10 ml of a 20 ppm solution of TCE in approximately 3 minutes, to give the hydrodechlorinated product, ethane, whereas the 10 g sample of the unpalladized iron filings (40 mesh) did not react at all in the same period of time. The same results were obtained with the 10 μm particles of palladized iron and unpalladized iron (FIG. 2).

In these batch experiments, the concentration of TCE in the solution was followed as a function of time. The initial decrease and the subsequent gradual decrease of the TCE in the solution, (FIGS. 1 and 2), in the presence of unpalladized iron, is believed to be caused by the slow equilibrium of the TCE between the headspace and the solution and not by the reaction of TCE with the unpalladized iron. This is confirmed by the absence of any detectable reactions products in the first 30 minutes. When the reaction is followed for much longer periods of time with the 10 μm particles of unpalladized iron, intermediate reaction products such as 1,1-dichloroethylene and 1,2-dichloroethylene (cis and trans), were identified in addition to ethane. Conversely, with palladized iron (10 μm particles) only ethane was identified in the GC.

EXAMPLE II

Dechlorination of One-carbon Compounds

Figure 3:
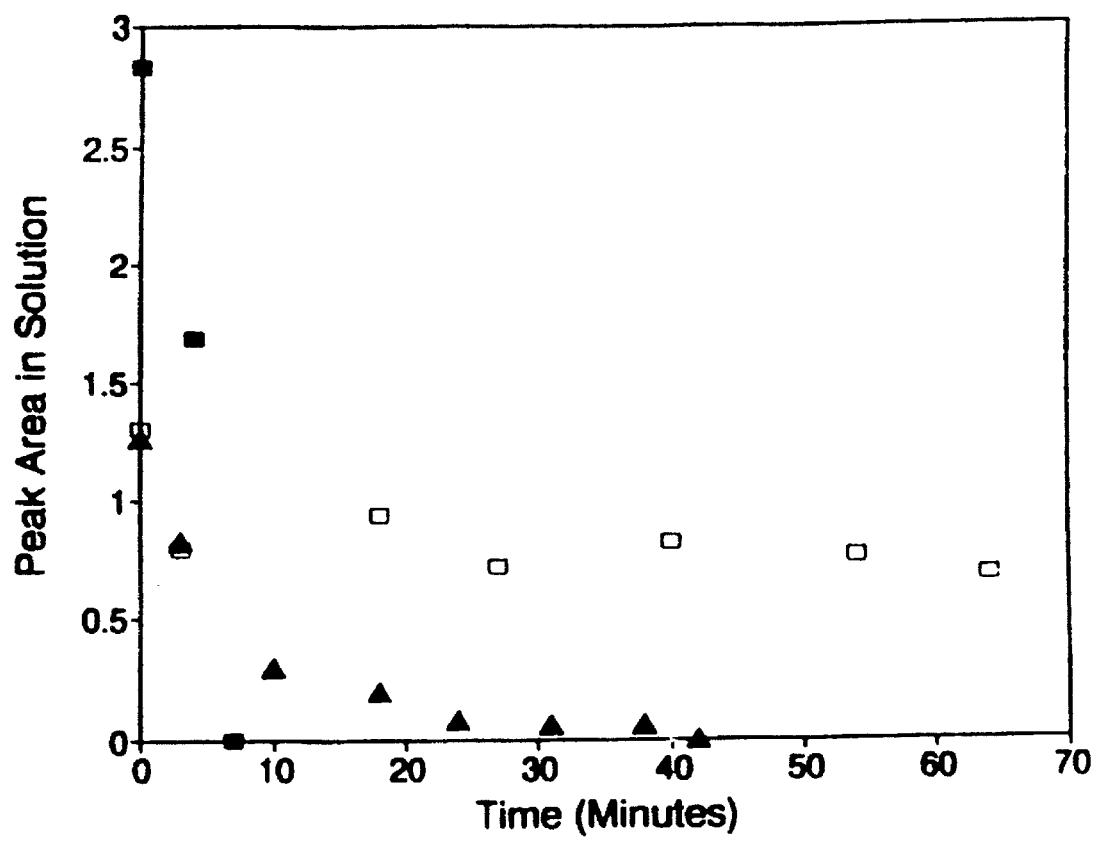
FIG. 3 illustrates the reaction of $CCl_4$, $CHCl_3$ and $CH_2Cl_2$ in contact with iron and palladized iron (10 μm particles ). The ■ denotes $CCl_4$ (saturated aqueous solution) with palladized iron, the ▲ denotes $CHCl_3$ (20 ppm) with palladized iron, and □ denotes $CH_2Cl_2$ (20 ppm) with palladized iron.

The dechlorination of one-carbon compounds such as $CCl_4$, $CHCl_3$ and $CH_2Cl_2$, was also studied with the palladized iron bimetallic system (10 μm particle size) produced in Example I. The results of this study are shown in FIG. 3. As is evident from FIG. 3, the rate of the dechlorination of $CCl_4$ is comparable to the that of the two-carbon unsaturated compounds. Moreover, as the number of chlorine atoms decreases, from carbon tetrachloride to chloroform and finally to methylene chloride, the rate of the dechlorination reaction decreases.

EXAMPLE III

Preparation of Palladized Iron

Palladium metal was deposited on the surface of iron metal (10 μm particles) by reacting the iron metal with a solution of $K_2PdCl_6$ (0.7 g in 100 ml of distilled water). Twenty milliliter aliquots of this solution were added to 4 g of the iron metal with stirring until the orange-red color of the $K_2PdCl_6$ was converted to a pale yellow color. This procedure of addition was repeated until about 9% of the surface and/or pores of the iron particles was covered with Pd metal.

As in Example I, the above-mentioned color changes signified that a redox reaction had occurred. The palladized iron bimetallic system thus formed was washed repeatedly with distilled water until the wash water did not give a precipitate with a few drops of 1M $AgNO_3$. The chloride free palladized iron bimetallic system was used in the dechlorination of TCE.

Dechlorination of TCE

The dechlorination experiments were performed in a thick-walled glass tube equipped with a stopcock which was used to allow the evolved gases to expand into a stainless steel tube. Fifteen milliliters of a TCE solution (20 ppm in distilled water) were added to 4 g of the palladized iron bimetallic system into the thick-walled glass tube.

Copious amounts of gases were evolved and were collected in the headspace above the reaction solution. The reaction was allowed to run overnight and the composition of the gas phase was determined by the following technique. The sample tube containing the reaction sample was connected to an extraction system. The stainless steel reaction vessel, transducer and the connecting tube were evacuated. The vacuum was then turned off and the valve on the reaction vessel was opened. After the initial pressure was recorded, the valve of the reaction vessel was turned off. The thick-walled sample tube was then removed and the extraction system was connected to a gas sampling valve.

After the sample loop, transducer, and the connecting tube were evacuated, the vacuum valve was turned off, the valve on the stainless steel reactor was opened, and the pressure was recorded. The gas sampling valve was then rotated to inject a sample into the GC/MS system. Gas standards were injected at varying pressure to bracket the peak area of the sample.

The GC/MS determinations were carried out on a HP model 5890 GC that was equipped with a split injection mode. The GC column (fused silica capillary column) was a Hewlett Packard HP-5 with a 5% phenylmethyl silicone crosslinked. Column specifications: length 25 m, ID 0.2 mm, film thickness 0.33 μm, carrier gas was He, column head pressure 18 psi. A Hewlett Packard 5970 mass spectrometer was used with the electron ionization set at 70 eV. The peaks were identified by library searches and compared with reference spectrum.

Figure 4:
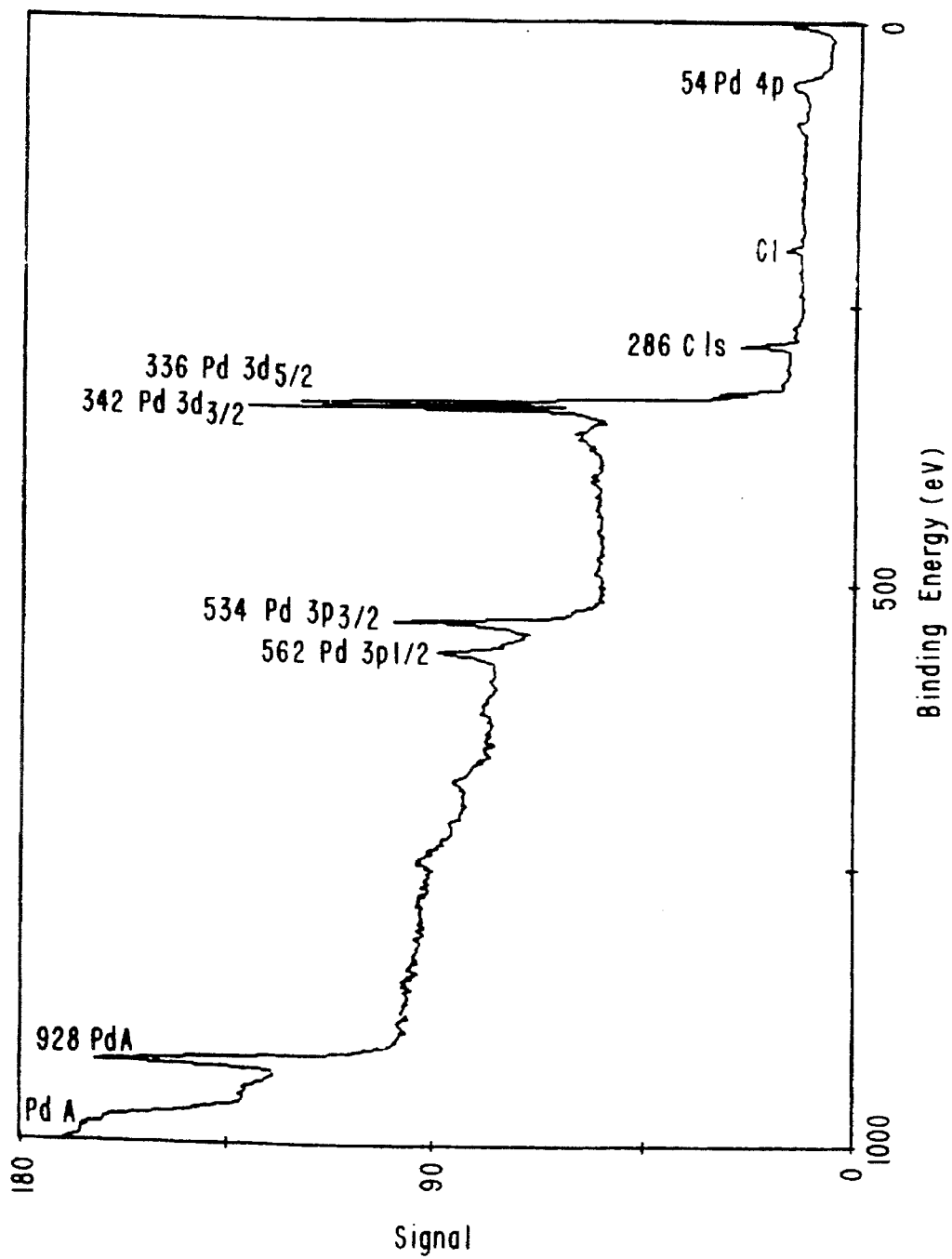
FIG. 4 is the X-ray photoelectron spectrum (XPS) of completely palladized iron.

FIG. 4 shows the X-ray photoelectron spectrum (XPS) of the completely palladized iron bimetallic system. The presence of Pd and carbon together with a small amount of adsorbed chloride ion were identified from their respective binding energies. As was expected no iron peaks were observed in the XPS of the completely palladized iron bimetallic system.

Figure 5:
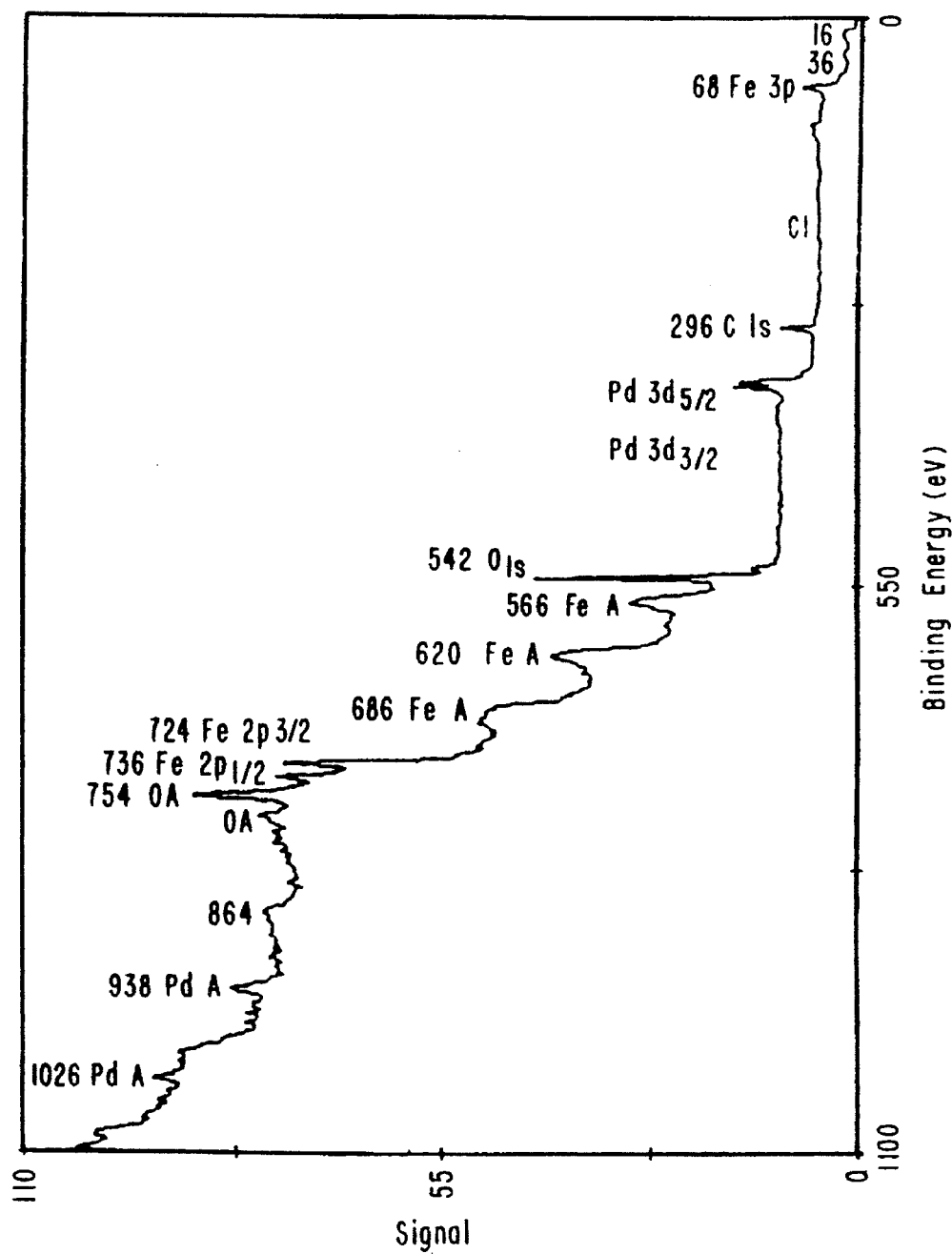
FIG. 5 is the XPS of Iron metal with 9% Pd coverage.

The XPS of the palladized iron bimetallic system, with a 9% Pd coverage, is shown in FIG. 5. In addition to the expected peaks for Pd, C, O and adsorbed chloride ion, the characteristic peaks for Fe were also observed.

In the dechlorination of TCE with the palladized iron bimetallic system (9% Pd), it was found that hydrogen gas as well as ethane were formed during the course of the reaction. No intermediate reaction products such as DCE or vinyl chloride were found in the GC/MS of the sample.

COMPARATIVE EXAMPLE I

In this comparative example, iron metal alone was used to dechlorinate TCE. Specifically, about 3 g of the iron metal particles used in Example III was placed into a 35 ml glass vial equipped with a septum, and distilled water containing 20 ppm TCE was added to the fill the vial. No headspace was left in the vial to avoid evaporation of TCE or the reaction products. The reaction was allowed to proceed for 12–24 hours with intermittent shaking. A one milliliter sample of the aqueous solution was withdrawn from the vial with the aid of a syringe and injected into an empty 35 ml vial. The headspace of this vial was analyzed by GC/MS using the equipment and conditions set forth in Example III.

Figure 6:
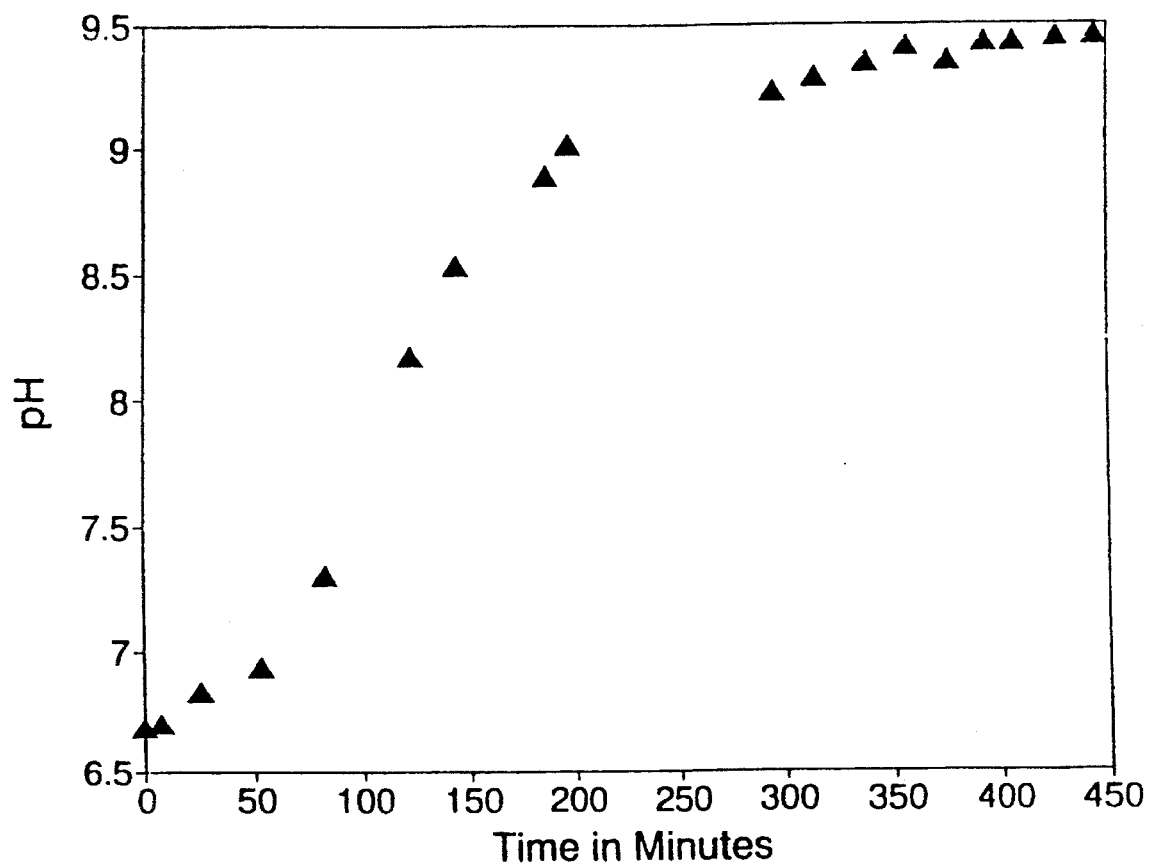
FIG. 6 illustrates the results of the hydrolysis of iron metal (6.88 g in 30 ml $H_2O$) in the absence of TCE.

In the absence of TCE, the pH of the aqueous solution, which was measured using a glass electrode calibrated with buffers at pH 4.0 and 7.0 at 25° C., also increased as a function of the time, and remained essentially constant after a rapid initial increase in pH. This result is shown in FIG. 6.

During the first several hours, no precipitates of iron hydroxides were observed. The dechlorination reaction slowed down considerably because the active sites on the surface and/or in the pores of the iron particles were deactivated by adsorption of ionic or molecular species from the solution.

Figure 7:
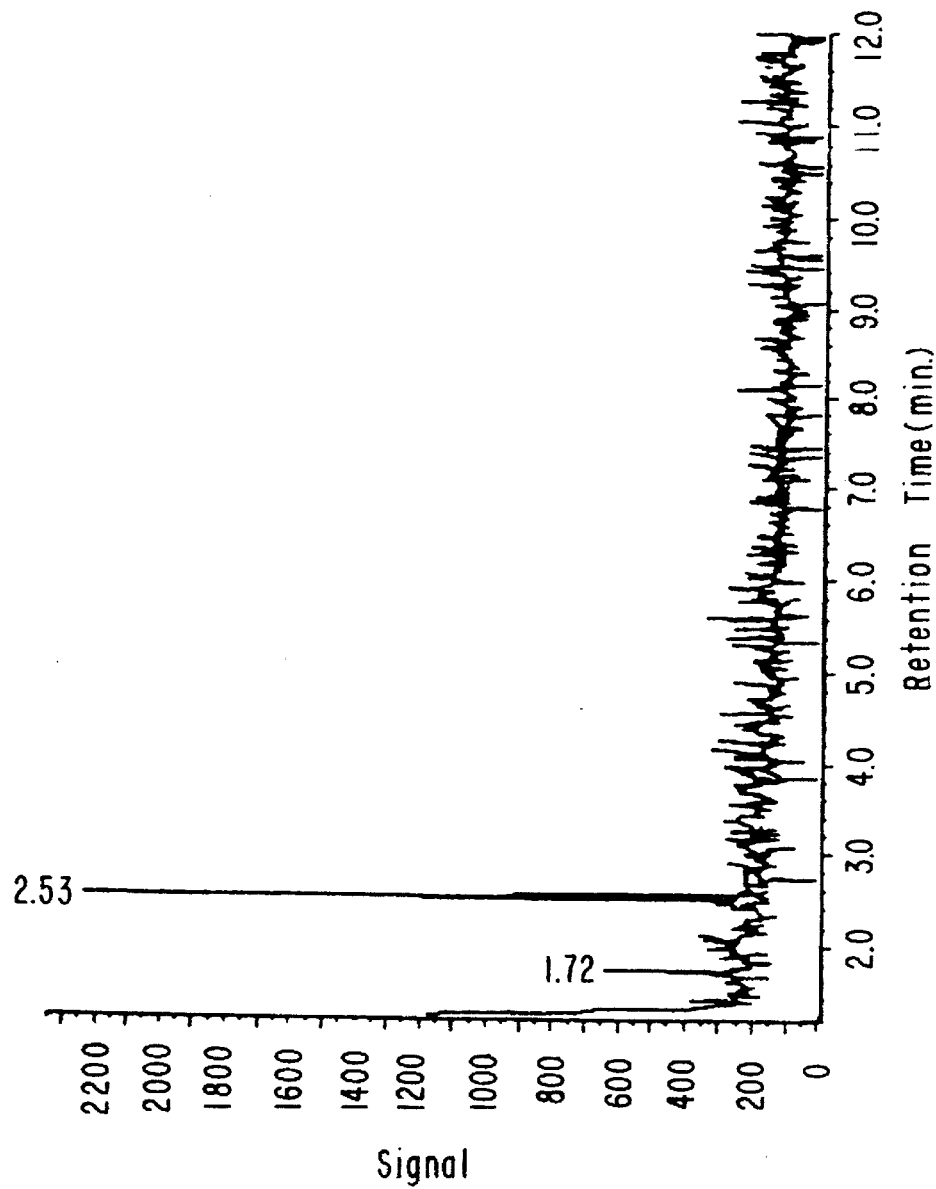
FIG. 7 shows the Gas Chromatographic (GC) separation of the products of the dechlorination reaction of TCE with iron metal particles.
Figure 8:
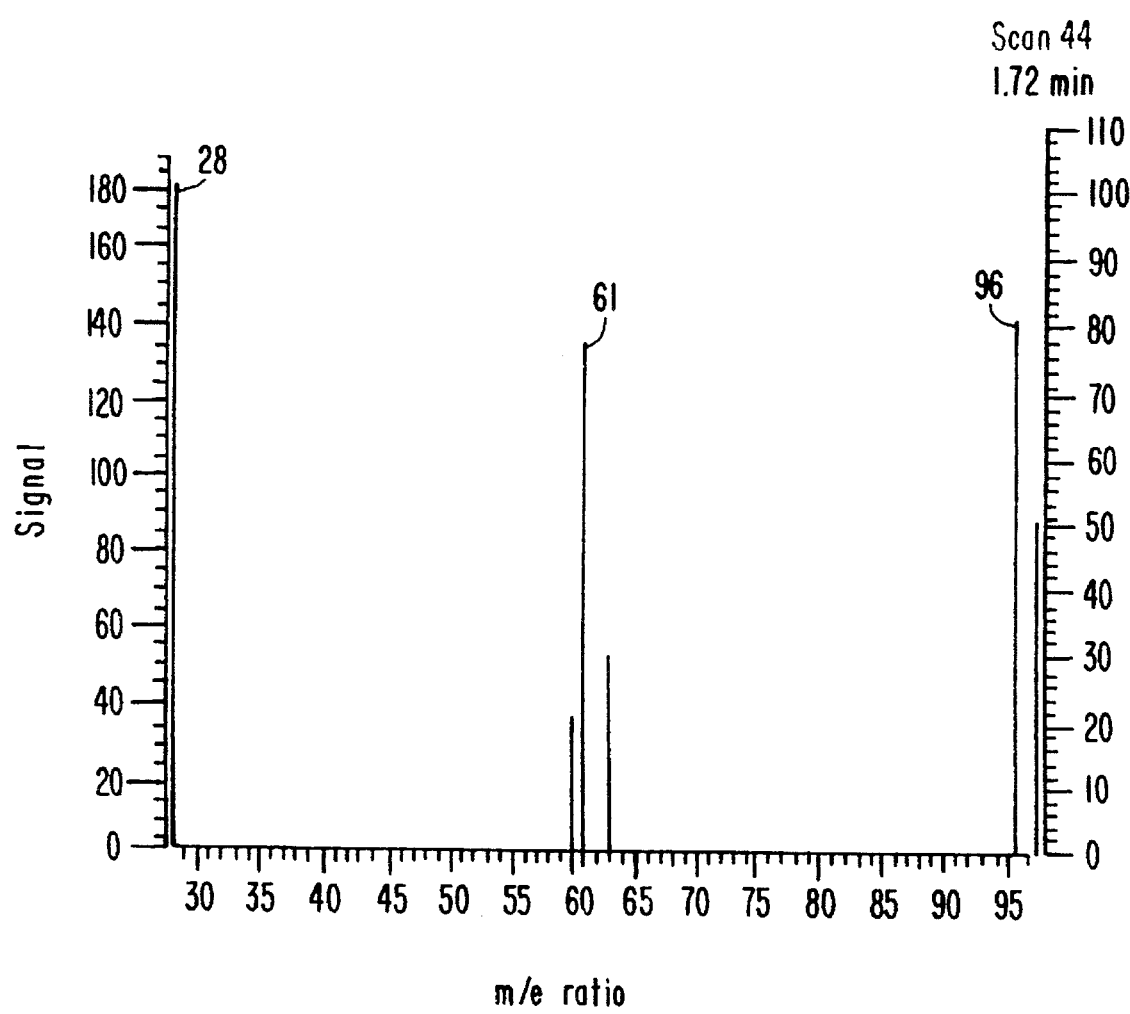
FIG. 8 shows the MS fragmentation pattern of the compound with a retention time of 1.72 minutes.
Figure 9:
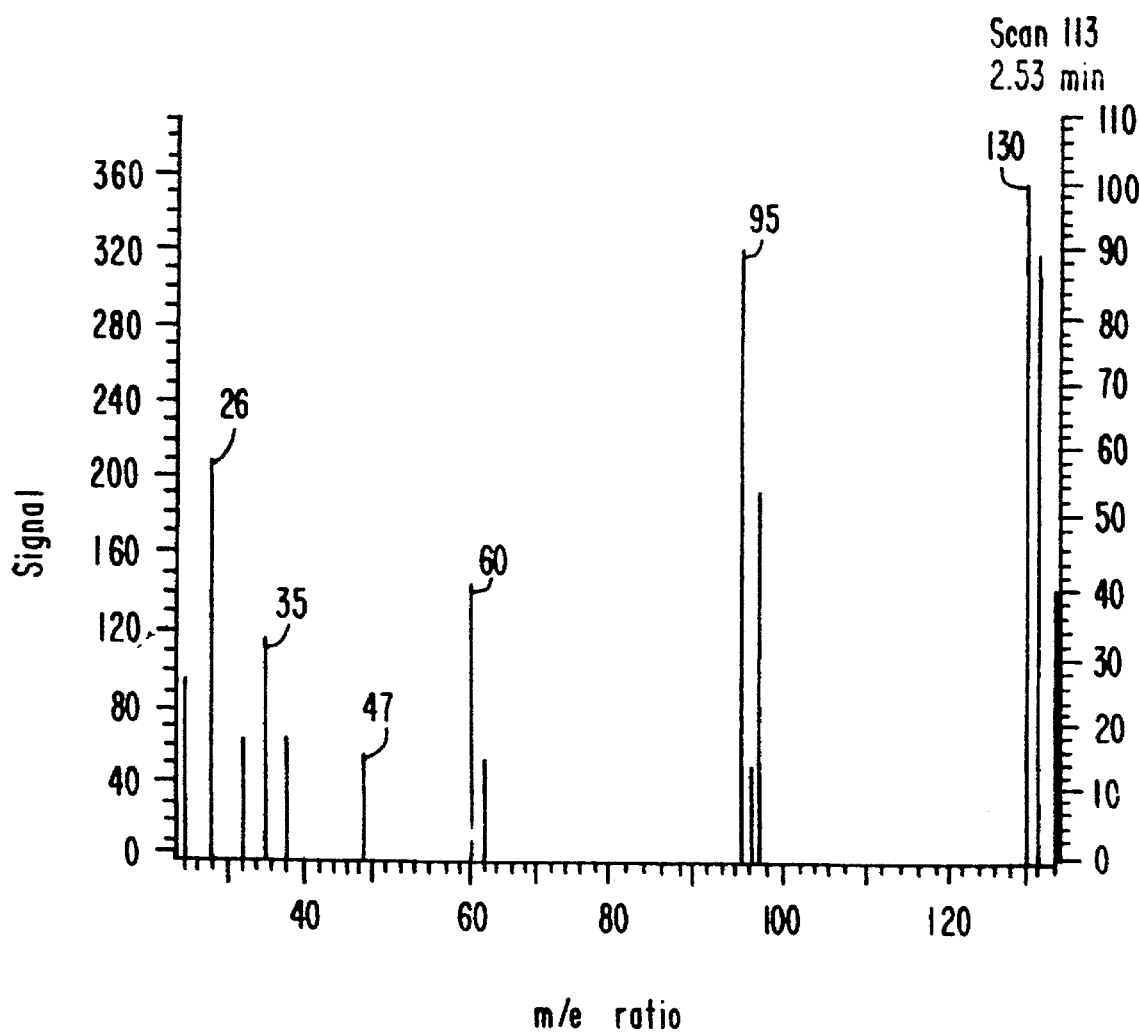
FIG. 9 shows the MS fragmentation pattern of the compound with a retention time of 2.53 minutes.

During the dechlorination of TCE by iron metal, the removal of the one chlorine atom should have resulted in the formation of only 1,2-dichloroethylene (DCE). The dechlorination reaction products that were separated by GC had retention times of 1.72 minutes and 2.53 minutes (FIG. 7). The compound with a retention time of 1.72 minutes had a molecular ion peak of 96 and a MS fragmentation pattern characteristic of DCE (FIG. 8). The compound with a retention time of 2.53 minutes had a molecular ion peak of 130 and a fragmentation pattern characteristic of TCE (FIG. 9).

The above results clearly illustrate that the reductive dechlorination of TCE using iron particles results in the formation of intermediate products such as DCE. In contrast, the reductive dechlorination of TCE with palladized iron particles as illustrated in Example III resulted in the complete conversion of TCE to ethane. Moreover, no intermediate reaction products whatsoever were observed using the palladized iron bimetallic system of Example III.

COMPARATIVE EXAMPLE II

Reaction of Dichloromethane in Contact with $NiCl_2$ Treated Fe

A nickel/iron (Ni/Fe) bimetallic system was prepared as follows: 6.0147 g of iron metal (10 μm particle size) was placed into a beaker containing 2.0411 g of $NiCl_2 \cdot 6H_2O$ that was previously dissolved in 10 ml of $H_2O$. The green mixture was stirred for 15–20 minutes. The green mixture was then decanted, and was washed 4–5 times with distilled water.

The Ni/Fe bimetallic system was then transferred to glass vial equipped with a cap fitted septum. A volume of 8 ml of 20 ppm $CH_2Cl_2$ in water was transferred to the vial. The vial and its contents were shaken vigorously for 3 minutes. A 2.0 μl sample was withdrawn from the vial and injected into a GC to determine the amount of reactant left in solution. Injections of the solution and headspace were made periodically. Gaseous products were seen in the headspace after 69 minutes. The solution was tested again after letting the reaction run for 21 hrs., and it was found that the $CH_2Cl_2$ in the solution dropped to 50% of the original amount.

The results of this comparative example are shown in FIG. 10. As shown therein, the Ni/Fe bimetallic system reacted very slowly, if at all with dichloromethane. In comparison the Pd/Fe bimetallic system of the instant invention reacted much more quickly and complete dechlorination of dichloromethane, as evident by FIG. 10, was achieved in about six hours. In contrast, less than half of the dichloromethane was dechlorinated with the Ni/Fe bimetallic system in about six hours.

The above preferred embodiments and examples are given to illustrate to the scope and spirit of the present invention. These embodiments and examples will make apparent to those skilled in the art other embodiments and examples. These other embodiments and examples are also within the contemplation of the present invention. Therefore, the present invention should be limited only by the appended claims.

What is claimed is:

1. A method of dechlorinating a chlorinated organic compound present in an aqueous effluent or groundwater comprising contacting said effluent with a palladized iron bimetallic system under conditions sufficient to dechlorinate said chlorinated organic compound.

2. The method of claim 1 wherein said palladized iron bimetallic system comprises palladium deposited on iron metal.

3. The method of claim 2 wherein said palladized iron bimetallic system contains from about 0.005% to about 50% palladium.

4. The method of claim 3 wherein said palladized iron bimetallic system contains from about 0.1% to about 20% palladium.

5. The method of claim 4 wherein said palladized iron bimetallic system contains about 5% palladium.

6. The method of claim 2 wherein said iron metal is iron wool, iron mesh, iron wire, iron grating, iron tubing, iron powder, iron particles, iron turnings, iron filings, sponge iron or an iron-containing alloy.

7. The method of claim 6 wherein the iron particles have a particle size from about 5 μm to about 100 μm.

8. The method of claim 7 wherein the iron particles have a particle size from about 10 μm to about 15 μm.

9. The method of claim 1 wherein said effluent is an aqueous effluent.

10. The method of claim 9 wherein said aqueous effluent contains from about 0.10 ppb to about 2000 ppm of said chlorinated organic compound.

11. The method of claim 10 wherein said aqueous effluent contains from about 5 ppm to about 200 ppm of said chlorinated organic compound.

12. The method of claim 1 wherein said chlorinated organic compound is a saturated chlorinated aliphatic hydrocarbon compound, an unsaturated chlorinated aliphatic or aromatic hydrocarbon compound, a polychlorinated biphenyl compound or a chlorine-containing pesticide.

13. The method of claim 12 wherein said unsaturated chlorinated compound is 1,1,2-trichloroethylene, 1,2-dichloroethylene, perchloroethylene, chlorinated phenols, 1,1-dichloroethene, trans-1,2-dichloroethene, cis and trans-1,3-dichloropropene or vinyl chloride.

14. The method of claim 13 wherein said unsaturated chlorinated compound is 1,1,2-trichloroethylene.

15. The method of claim 12 wherein said saturated chlorinated compound is carbon tetrachloride, dichloromethane, chloroform, bromodichloromethane, chloroethane, dibromochloromethane, dichlorodifluoromethane, 1,1-dichloroethane, 1,2-dichloroethane, 1,2-dichloropropane, 1,1,2,2-tetrachloroethane, 1,1,1-trichloroethane or trichlorofluoromethane.

16. The method of claim 12 wherein said polychlorinated biphenyl compound is 1,1,1-trichloro-2,2-bis (p-chlorophenyl) ethane, 1,1,-dichloro-2,2-bis(p-chlorophenyl) ethane, 1,1-dichloro-2,2-bis(p-chlorophenyl) ethene, 2,2-bis(p-methoxyphenyl)-1,1,1-trichloroethane, O,O-bis(p-chlorophenyl) acetimidoylphosphoramidothioate, 2,4-dichlorophenyl p-nitrophenyl ether, α,α-bis(p-chlorophenyl)-3-pyridine methanol, 1,1-dichloro-2,2-bis(p-ethylphenyl) ethane, O-(4-bromo-2,5-dichlorophenyl), O-methylphenylphosphonothioate or 4' chlorophenyl 2,4,5-trichlorophenyl sulfone.

17. The method of claim 12 wherein chlorine-containing pesticide is decachlorooctahydro-1,3,4-metheno-2-H-cyclobuta[cd]pentalene-2-one, 1,2,3,4,5,6-hexachlorocyclohexane, dodecachlorooctahydro-1,3,4-metheno-1H-cyclobuta[cd]-pentalene, 1,2-dibromo-2,2-dichloroethyldimethyl phosphate, O,O-dimethyl-O-(2,4,5-trichlorophenyl) phosphorothiate, 4-tert-butyl-2-chlorophenyl-O-methyl methylphosphoroamidate, S-(2-chloro-phthalimido-ethyl) O,O diethyl phosphorodithioate, chlorinated camphene, S-[[p-chlorophenyl) thio]methyl] O,O-diethyl phosphorodithioate, O-[2-chloro-1-(2,5-dichlorophenyl)-vinyl] O,O-diethyl phosphorothioate, 1,2,3,4,10, 10-hexachloro-1, 4,4a,5,8,8a-hexahydro-1,4 endo-exo-5,8-dimethanonaphthalene, O,O-diethyl O-(3,5,6-trichloro-2-pyridyl) phosphorothioate, O,O-dimethyl(2,2,2-trichloro-1-hydroxylethyl)phosphonate, 6,7,8,9,10,10-hexachloro-1,5, 5a,6,9,9a-hexahydro-6,9-methano-2, 4,3-benzodioxathiepin-3-oxide, or 1,2,3,4,10,10-hexachloro-6, 7-epoxy-1,4, 4a,5,6,7,8,8a-octahydro-1,4-endo-endo-5,8-dimethanonaphthalene.

18. An above-ground method for dechlorinating chlorinated organic compounds present in a groundwater comprising (a) providing a water treatment device containing a palladized iron bimetallic system disposed therein; (b) pumping groundwater to said water treatment device of step (a) to contact said groundwater with said compound; and (c) reacting said groundwater with said palladized iron bimetallic system under conditions sufficient to dechlorinate said chlorinated organic compound.

19. The method of claim 18 wherein said palladized iron bimetallic system comprises palladium deposited on iron metal.

20. The method of claim 19 wherein said palladized iron bimetallic system contains from about 0.005% to about 50% palladium.

21. The method of claim 20 wherein said palladized iron bimetallic system contains from about 0.01% to about 20% palladium.

22. The method of claim 21 wherein said palladized iron bimetallic system contains about 5% palladium.

23. The method of claim 19 wherein said iron metal is iron wool, iron mesh, iron wire, iron grating, iron tubing, iron powder, iron particles, iron turnings, iron filings, sponge iron or an iron-containing alloy.

24. The method of claim 23 wherein the iron particles have a particle size from about 5 μm to about 100 μm.

25. The method of claim 24 wherein the iron particles have a particle size from about 10 μm to about 15 μm.

26. The method of claim 18 wherein said underground water contains from about 0.01 ppb to about 2000 ppm of said chlorinated organic compound.

27. The method of claim 26 wherein said underground water contains from about 5 ppm to about 200 ppm of said chlorinated organic compound.

28. The method of claim 18 wherein said chlorinated organic compound is a saturated chlorinated aliphatic hydrocarbon compound, an unsaturated chlorinated aliphatic or aromatic hydrocarbon compound, a polychlorinated biphenyl compound or a chlorine-containing pesticides.

29. The method of claim 28 wherein said unsaturated chlorinated compound is 1,1,2-trichloroethylene, 1,2-dichloroethylene, perchloroethylene, chlorinated phenols, 1,1-dichloroethene, trans-1,2-dichloroethene, cis and trans-1,3-dichloropropene or vinyl chloride.

30. The method of claim 29 wherein said unsaturated chlorinated compound is 1,1,2-trichlorethylene.

31. The method of claim 28 wherein said saturated chlorinated compound is carbon tetrachloride, dichloromethane, chloroform, bromodichloromethane, chloroethane, dibromochloromethane, dichlorodifluoromethane, 1,1-dichloroethane, 1,2-dichloroethane, 1,2-dichloropropane, 1,1,2,2-tetrachloroethane, 1,1,1-trichloroethane or trichlorofluoromethane.

32. The method of claim 28 wherein said polychlorinated biphenyl compound is 1,1,1-trichloro-2, 2-bis(p-chlorophenyl) ethane, 1,1,-dichloro-2,2-bis(p-chlorophenyl) ethane, 1,1-dichloro-2,2-bis(p-chlorophenyl) ethene, 2,2-bis(p-methoxyphenyl)-1,1,1-trichloroethane, O,O-bis(p-chlorophenyl) acetimidoylphosphoramidothioate, 2,4-dichlorophenyl p-nitrophenyl ether, α,α-bis(p-chlorophenyl)-3-pyridine methanol, 1,1-dichloro-2, 2-bis(p-ethylphenyl) ethane, O-(4-bromo-2,5-dichlorophenyl), O-methylphenyl-phosphonothioate or 4' chlorophenyl 2,4,5-trichlorophenyl sulfone.

33. The method of claim 28 wherein chlorine-containing pesticide is decachlorooctahydro-1,3,4-metheno-2-H-cyclobuta[cd]pentalene-2-one, 1,2,3,4,5,6-hexachlorocyclohexane, dodecachlorooctahydro-1,3,4-metheno-1H-cyclobuta[cd]-pentalene, 1,2-dibromo-2,2-dichloroethyldimethyl phosphate, O,O-dimethyl-O-(2,4,5-trichlorophenyl) phosphorothiate, 4-tert-butyl-2-chlorophenyl-O-methyl methylphosphoroamidate, S-(2-chloro-phthalimido-ethyl) O,O diethyl phosphorodithioate, chlorinated camphene, S-[[p-chlorophenyl)thio]methyl] O,O-diethyl phosphorodithioate, O-[2-chloro-1-(2,5-dichlorophenyl)-vinyl] O,O-diethyl phosphorothioate, 1,2,3,4,10, 10-hexachloro-1, 4,4a,5,8,8a-hexahydro-1,4 endo-exo-5,8-dimethanonaphthalene, O,O-diethyl O-(3,5,6-trichloro-2-pyridyl) phosphorothioate, O,O-dimethyl(2,2,2-trichloro-1-hydroxylethyl) phosphonate, 6,7,8,9,10,10-hexachloro-1,5, 5a,6,9,9a-hexahydro-6,9-methano-2,4,3-benzodioxathiepin-3-oxide, or 1,2,3,4,10,10-hexachloro-6,7-epoxy-1,4,4a,5,6, 7,8,8a-octahydro-1,4-endo-endo-5,8-dimethanonaphthalene.

34. The method of claim 18 wherein said water treatment device is a filter, a column, a skid-mounted system, a portable tank or bath, a perforated or nonperforated panel or wall, a tube or a fluidized bed.

35. The method of claim 34 wherein said device is a column or a skid-mounted system.

36. The method of claim 18 wherein said groundwater is pumped at a flow rate from about 1 gallon/minute to about 20 gallons/minute to said water treatment device.

37. An in-ground method for dechlorinating chlorinated organic compounds present in an underground water comprising (a) providing an underground water treatment device containing a palladized iron bimetallic system disposed therein; (b) providing said underground water treatment device into a underground water supply; and (c) reacting said underground water with said palladized iron bimetallic system under conditions sufficient to dechlorinate said chlorinated organic compound.

38. The method of claim 37 wherein said palladized iron bimetallic system comprises palladium deposited on iron metal.

39. The method of claim 38 wherein said palladized iron bimetallic system contains from about 0.005% to about 50% palladium.

40. The method of claim 39 wherein said palladized iron bimetallic system contains from about 0.1% to about 20% palladium.

41. The method of claim 40 wherein said palladized iron bimetallic system contains about 5% palladium.

42. The method of claim 38 wherein said iron metal is iron wool, iron mesh, iron wire, iron grating, iron tubing, iron powder, iron particles, iron turnings, iron filings, sponge iron or an iron-containing alloy.

43. The method of claim 42 wherein the iron particles have a particle size from about 5 μm to about 100 μm.

44. The method of claim 43 wherein the iron particles have a particle size from about 10 μm to about 15 μm.

45. The method of claim 37 wherein said underground water supply contains from about 0.10 ppb to about 2000 ppm of said chlorinated organic compound.

46. The method of claim 45 wherein said underground water supply contains from about 5 ppm to about 200 ppm of said chlorinated organic compound.

47. The method of claim 37 wherein said chlorinated organic compound is a saturated chlorinated aliphatic hydrocarbon compound, an unsaturated chlorinated aliphatic or aromatic hydrocarbon compound, a polychlorinated biphenyl compound or a chlorine-containing pesticide.

48. The method of claim 47 wherein said unsaturated chlorinated compound is 1,1,2-trichloroethylene, 1,2-dichloroethylene, perchloroethylene, chlorinated phenols, 1,1-dichloroethene, trans-1,2-dichloroethene, cis and trans-1,3-dichloropropene or vinyl chloride.

49. The method of claim 48 wherein said unsaturated chlorinated compound is 1,1,2-trichloroethylene.

50. The method of claim 47 wherein said saturated chlorinated compound is carbon tetrachloride, dichloromethane, chloroform, bromodichloromethane, chloroethane, dibromochloromethane, dichlorodifluoromethane, 1,1-dichloroethane, 1,2-dichloroethane, 1,2-dichloropropane, 1,1,2,2-tetrachloroethane, 1,1,1-trichloroethane or trichlorofluoromethane.

51. The method of claim 47 wherein said polychlorinated biphenyl compound is 1,1,1-trichloro-2, 2-bis(p-chlorophenyl) ethane, 1,1,-dichloro-2,2-bis(p-chlorophenyl) ethane, 1,1-dichloro-2,2-bis(p-chlorophenyl) ethene, 2,2-bis(p-methoxyphenyl)-1,1,1-trichloroethane, O,O-bis(p-chlorophenyl) acetimidoylphosphoramidothioate, 2,4-dichlorophenyl p-nitrophenyl ether, α,α-bis(p-chlorophenyl)-3-pyridine methanol, 1,1-dichloro-2, 2-bis(p-ethylphenyl) ethane, O-(4-bromo-2,5-dichlorophenyl), O-methylphenylphosphonothioate or 4' chlorophenyl 2,4,5-trichlorophenyl sulfone.

52. The method of claim 47 wherein chlorine-containing pesticide is decachlorooctahydro-1,3,4-metheno-2-H-cyclobuta[cd]pentalene-2-one, 1,2,3,4,5,6-hexachlorocyclohexane, dodecachlorooctahydro-1,3,4-metheno-1H-cyclobuta[cd]-pentalene, 1,2-dibromo-2,2-dichloroethyldimethyl phosphate, O,O-dimethyl-O-(2,4,5-trichlorophenyl) phosphorothiate, 4-tert-butyl-2-chlorophenyl-O-methyl methylphosphoroamidate, S-(2-chloro-phthalimido-ethyl) O,O diethyl phosphorodithioate, chlorinated camphene, S-[[p-chlorophenyl)thio] methyl] O,O-diethyl phosphorodithioate, O-[2-chloro-1-(2,5-dichlorophenyl)vinyl] O,O-diethyl phosphorothioate, 1,2,3,4,10,10-hexachloro-1,4,4a,5,8,8a-hexahydro-1,4 endo-exo-5,8-dimethanonaphthalene, O,O-diethyl O-(3,5,6-trichloro-2-pyridyl) phosphorothioate, O,O-dimethyl(2,2,2-trichloro-1-hydroxylethyl) phosphonate, 6,7,8,9,10,10-hexachloro-1,5,5a,6,9,9a-hexahydro-6,9-methano-2,4,3-benzodioxathiepin-3-oxide, or 1,2,3,4,10,10-hexachloro-6,7-epoxy-1,4,4a,5,6,7,8,8a-octahydro-1,4-endo-endo-5,8-dimethanonaphthalene.

53. The method of claim 37 wherein said underground water treatment device is a gate, a bag, a tube or a perforated or nonperforated panel or wall.

* * * * *

UNITED STATES PATENT AND TRADEMARK OFFICE
CERTIFICATE OF CORRECTION

PATENT NO. : 5,611,936
DATED : March 18, 1997
INVENTOR(S) : Quintus Fernando, et al.

It is certified that error appears in the above-indentified patent and that said Letters Patent is hereby corrected as shown below:

Column 10, line 1: "6Cl" should read -- $6Cl^-$ --

Column 13, line 37, Claim 1: "groundwater" should read --wastewater--

Signed and Sealed this

Tenth Day of February, 1998

Attest:

BRUCE LEHMAN

*Attesting Officer*     *Commissioner of Patents and Trademarks*